United States Patent [19]

Ball et al.

[11] Patent Number: 4,749,151

[45] Date of Patent: Jun. 7, 1988

[54] APPARATUS FOR RE-ENERGIZING BOUNDARY LAYER AIR

[75] Inventors: William H. Ball, Mercer Island; Jan Syberg, Kent, both of Wash.

[73] Assignee: The Boeing Company, Seattle, Wash.

[21] Appl. No.: 777,826

[22] Filed: Sep. 19, 1985

[51] Int. Cl.⁴ .............................................. B64D 33/02
[52] U.S. Cl. ................................... 244/53 B; 137/15.1; 244/207
[58] Field of Search ........................... 244/53 B, 207; 137/15.1, 15.2

[56] References Cited

U.S. PATENT DOCUMENTS

| | | | |
|---|---|---|---|
| 2,868,480 | 1/1959 | Antinello | 244/207 |
| 3,276,727 | 10/1966 | Clark | 244/207 |
| 3,756,540 | 9/1973 | Williams | 244/207 |
| 3,830,450 | 8/1974 | Williams et al. | 244/207 |
| 3,889,903 | 6/1975 | Hilby | 244/207 |
| 4,000,869 | 1/1977 | Wong et al. | 244/53 B |

FOREIGN PATENT DOCUMENTS 546620  7/1956  Italy ................................ 244/53 B Primary Examiner—Galen Barefoot
Attorney, Agent, or Firm—Bruce A. Kaser

[57] ABSTRACT

Air is blown into an air boundary layer to re-energize the boundary layer prior to its ingestion by an engine inlet (12) of a supersonic aircraft (10).

7 Claims, 4 Drawing Sheets

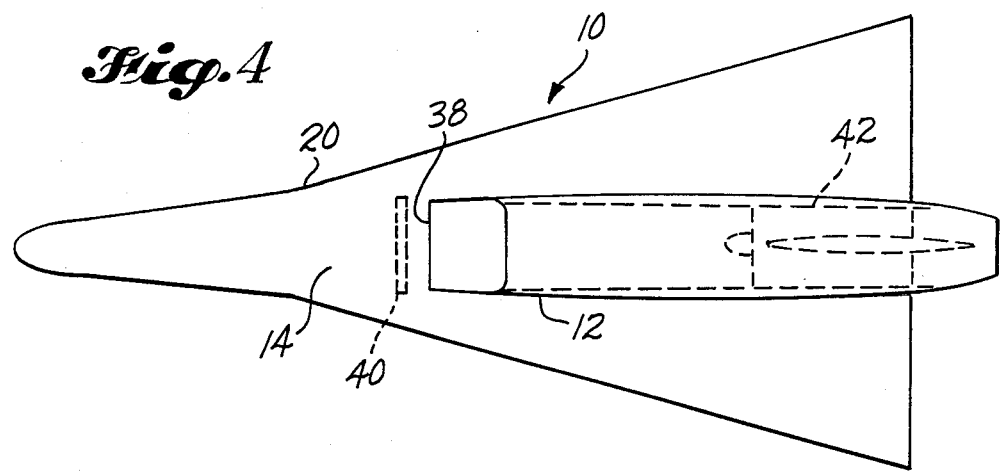
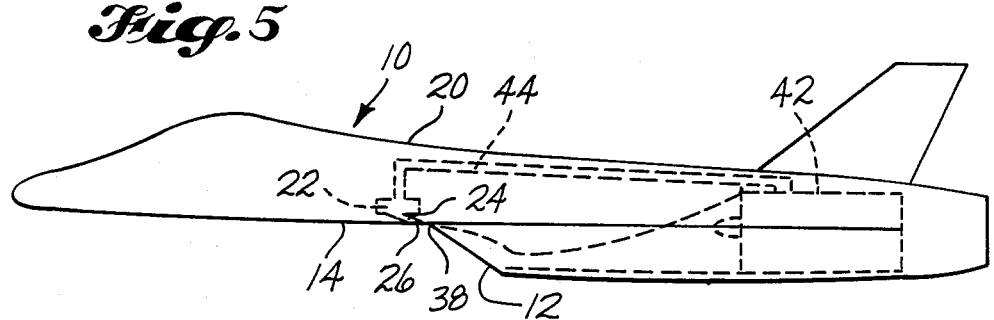
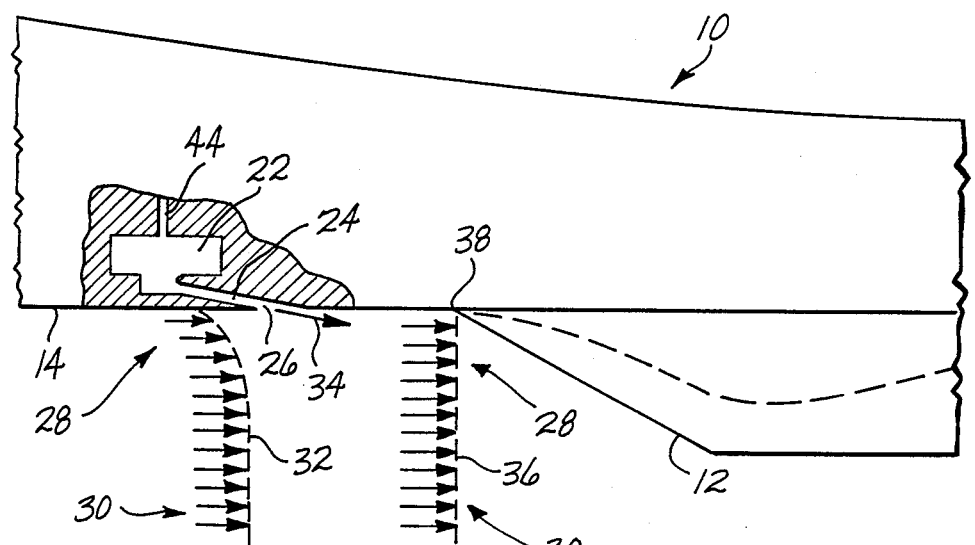

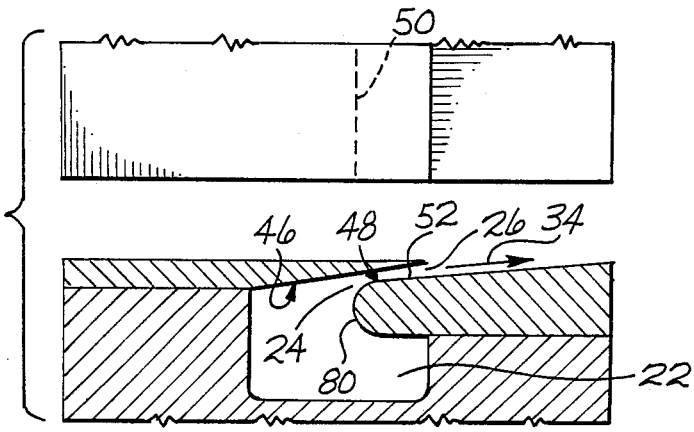
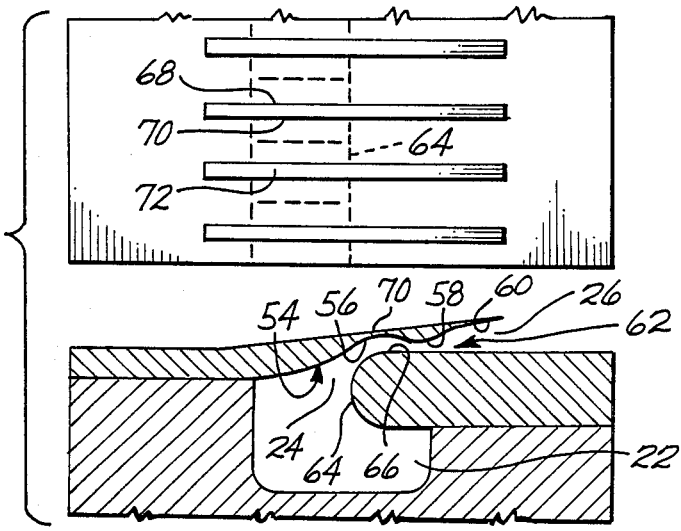
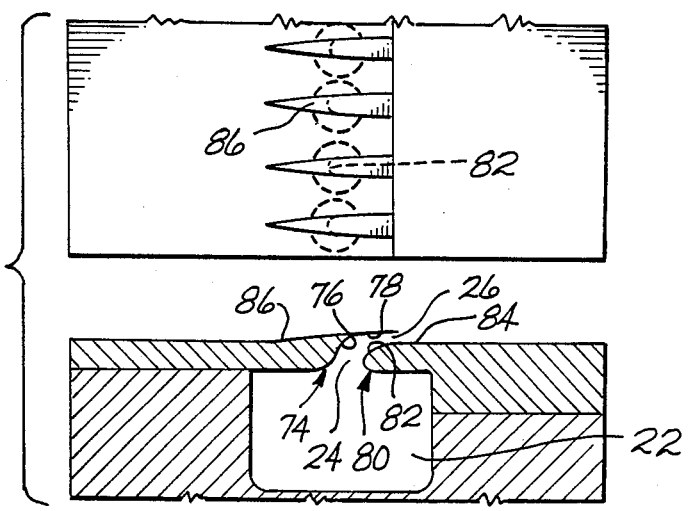

APPARATUS FOR RE-ENERGIZING BOUNDARY LAYER AIR

DESCRIPTION

1. Technical Field

This invention relates to engine inlets for supersonic aircraft. More particularly, the invention relates to a supersonic inlet mounted to an aircraft in a position such that the inlet may ingest or receive boundary layer air during supersonic flight.

2. Background Art

The presence of boundary layer air on the fuselage of an aircraft during flight is a well-known phenomenon. In supersonic aircraft, it is desirable that little or no boundary layer air be received or ingested by an engine inlet because inlet ingestion of the boundary layer can cause pressure recovery and airflow distortion problems in the inlet.

Several different forms of boundary layer diverters have been used in those types of supersonic aircraft wherein inlets are positioned nearby surfaces upon which a boundary layer develops. One common type of diverter displaces the inlet a sufficient distance away from the surface so that the entire boundary layer is positioned between the inlet and the surface. This is schematically illustrated in FIG. 1, wherein a supersonic aircraft 10 is shown having an inlet 12 mounted a certain distance away from the bottom surface 14 of the aircraft fuselage.

Another type of diverter, not shown in the drawings, employs a scoop ahead of the inlet. When this type of diverter is used the inlet is typically mounted directly to the aircraft fuselage and the diverter scoop is mounted to the fuselage forwardly of the inlet. The scoop captures the boundary layer and diverts it through a passageway to a location aft of the inlet where it is dumped into the ambient atmosphere.

A person skilled in the art would realize that both of the above-described diverters cause increased aircraft drag which is undesirable. These diverters also increase aircraft cross-sectional area and increase aircraft weight, both of which are also undesirable.

The purpose of this invention is to eliminate the use of conventional diverters and to permit the mounting of a supersonic inlet directly adjacent an exterior surface of a supersonic aircraft. This arrangement is schematically illustrated in FIG. 2 and would alleviate the above-mentioned drawbacks associated with conventional diverter designs.

3. Disclosure of the Invention

The present invention is meant for use in supersonic aircraft having at least one jet engine inlet mounted adjacent a surface of the aircraft upon which boundary layer air is present. Currently, many supersonic aircraft have engine inlets mounted adjacent the bottom side of the aircraft fuselage, as in the manner schematically shown in FIGS. 1 and 2. Boundary layer air develops along the bottom of the fuselage and at least a portion thereof is likely to be received or ingested by the inlet unless adequate preventive measures are taken.

Boundary layer air has a certain pressure profile which, by way of illustrative example only, typically has the shape shown by the solid line 16 in FIG. 3. As a person skilled in the art would know, boundary layer air develops between an aircraft exterior surface and the ambient environment, which will be referred to herein as free stream air. Free stream air has a pressure profile that looks like the dashed line 18 in FIG. 3.

The invention provides a means for blowing air into the boundary layer, for re-energizing the boundary layer, so that it will have a total pressure profile that substantially matches the total pressure profile of free stream air. By accomplishing this, any pressure recovery or airflow distortion problems caused by inlet ingestion of the boundary layer will be alleviated or eliminated.

The air blowing means is positioned forwardly of the inlet. It may include at least one port in the exterior surface of the aircraft, a means for providing a source of high pressure air, and a nozzle connecting the high pressure air source means to the port. The air pressure provided by the air source means must be higher than the pressure of the air in the boundary layer. It also must be high enough to re-energize the boundary layer so that its profile will match the free stream profile. The nozzle and port cooperate to direct a flow of high pressure air from the air source means into the boundary layer, whereby the flow is directed from the port toward the aircraft inlet.

Engine bleed air, in combination with a high pressure plenum, may be utilized as the high pressure air source means. Present calculations have shown that the boundary layer can be re-energized by bleeding and blowing approximately 1% of total engine airflow. Aircraft designers generally acknowledge that it is a disadvantage to utilize engine bleed air since it adversely affects engine performance. The disadvantage in this case, however, is offset by the advantage of a reduction in drag due to the elimination of conventional diverters, and the further advantage of reducing aircraft cross-sectional area and weight.

BRIEF DESCRIPTION OF THE DRAWINGS

Referring now to the drawings, wherein like reference numerals and letters refer to like parts throughout the various views:

FIG. 4 is a bottom plan view of a supersonic aircraft, and schematically shows the position of a row of blowing nozzles located in the bottom exterior surface of the aircraft fuselage forwardly of a supersonic inlet;

FIG. 5 is a side view of the aircraft shown in FIG. 4, and schematically shows bleeding high pressure engine air into a high pressure plenum, the plenum being connected to a port in the bottom surface of the fuselage by a nozzle;

FIG. 6 is an enlarged fragmentary view of FIG. 5, taken in the vicinity of the forward end of the inlet, and shows a nozzle blowing high pressure air into boundary layer air, and the influence such high pressure air has on the pressure profile of the boundary layer with regard to re-energizing it so that its profile matches the pressure profile of free stream air;

FIG. 7 includes two Figs., the top Fig. showing a top plan view of a slot-shaped blowing nozzle, and the lower Fig. showing a cross-sectional view thereof;

FIG. 8 is similar to FIG. 7 but shows a different nozzle configuration, the top Fig. showing a top plan view of a plurality of discrete 2-D C-D nozzles, and the lower Fig. showing a cross-sectional view thereof;

FIG. 9 is similar to FIGS. 7 and 8 but shows still another nozzle configuration, wherein the top Fig. is a top plan view of a plurality of convergent half-round nozzles, and the bottom Fig. is a cross-sectional view thereof;

BEST MODE FOR CARRYING OUT THE INVENTION

Figure 1:
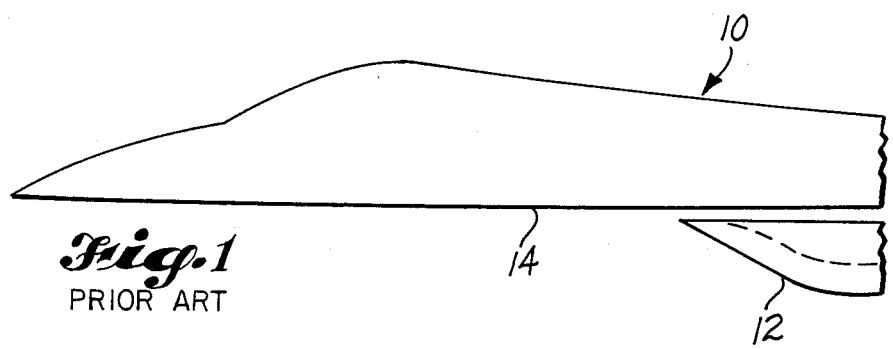
FIG. 1 is a schematic drawing showing the profile of the forward ends of a supersonic aircraft fuselage and engine inlet, and further showing the inlet spaced a distance from the fuselage to accommodate placement of a boundary layer diverter.
Figure 2:
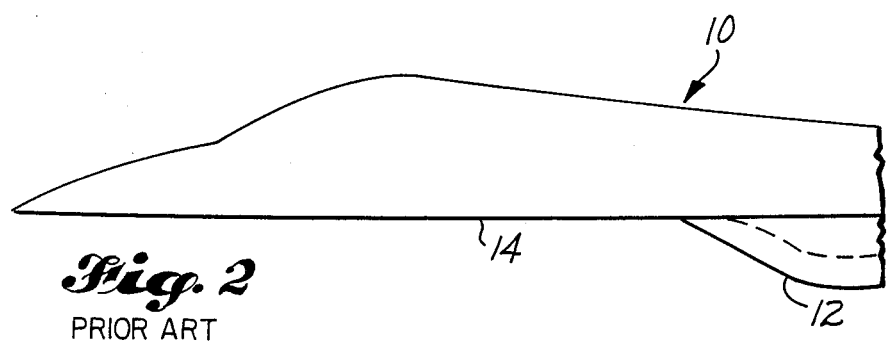
FIG. 2 is a schematic drawing like FIG. 1, but shows placement of the inlet adjacent the aircraft fuselage.
Figure 3:
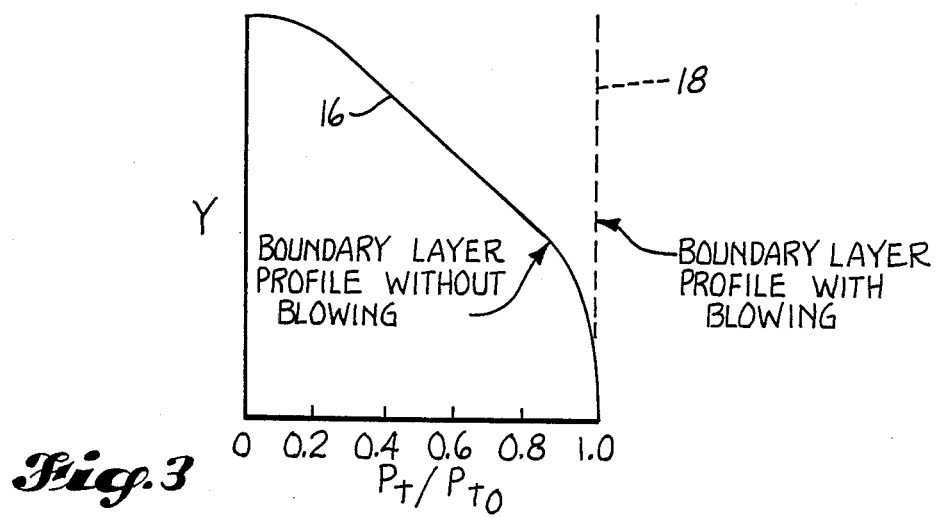
FIG. 3 is a graph of a typical boundary layer pressure profile, and shows how the total pressure in the boundary layer varies in accordance with distance from the surface upon which the boundary layer develops; the "Y" vertical axis being representative of distance from the surface, and the "$P_t/P_{to}$" horizontal axis being representative of the ratio of the total pressure in the boundary layer to the total pressure of adjacent ambient or free stream air.

Referring now to FIG. 6, therein is shown a central portion 20 of the fuselage of the aircraft 10, the aircraft also being shown throughout FIGS. 1, 2, 4 and 5. This portion 20 includes a high pressure air plenum 22. Connected to the plenum 22 is a nozzle 24 which blows high pressure air from the plenum 22 out through a port 26.

The port 26 of the nozzle is located in the bottom fuselage surface 14 forwardly of a leading edge 38 of the inlet 12. The nozzle 24 and port 26 may take a variety of suitable forms but will preferably occupy a region such as region 40 shown in FIG. 4.

The high pressure air is blown into an air boundary layer 28 that is located adjacent the bottom surface 14 of the fuselage, between the surface 14 and ambient or free stream air 30. The boundary layer (forwardly of the port 26) and free stream air 28, 30 together have a pressure profile that is substantially the same as the profile indicated by the dashed line 32 in FIG. 6.

The nozzle and port 24, 26 cooperate to direct or blow the high pressure air into the boundary layer 28 in the manner indicated by arrow 34. This high pressure air 34 re-energizes the boundary layer 28 so that its pressure profile substantially matches the pressure profile of the free stream air 30, before the boundary layer is ingested by the inlet 12. The resultant effect of such re-energization is schematically illustrated by the dashed line 36 in FIG. 6.

An air source or means for providing high pressure air to the plenum 22 may be provided by bleeding high pressure air from an engine 42 located onboard the aircraft 10. An air delivery conduit 44 could be provided by communicating engine bleed air from the engine 42 to the plenum 22. The technology for providing this type of conduit would be well-known to a person skilled in the art.

In one embodiment of the invention, the nozzle and port 24, 26 may be in the form of a full width slot positioned in the region 40 forwardly of the inlet 12. This embodiment is illustrated in FIG. 7. The nozzle 24 has a first sidewall 46 having a straight portion that extends in an elongated manner transversely and forwardly of the inlet leading edge 38. This is illustrated by the top Fig. in FIG. 7. A second sidewall portion 48 of this nozzle includes a rounded portion 50 and a straight portion 52. The rounded and straight portions 50, 52 of the second sidewall 48 cooperate with the straight portion 46 of the first sidewall 46 to form a nozzle throat region.

The full width slot configuration shown in FIG. 7 could be replaced by a plurality of high aspect 2-D C-D nozzles having the same general cross section as the nozzle shown in the bottom part of FIG. 7. This configuration is not shown in the drawings, however.

In another embodiment of the invention, shown in FIG. 8, the nozzle 24 is in the form of a plurality of nozzles which occupy the region 40. In this embodiment, each nozzle 24 includes a first sidewall 54 having an inwardly curving portion 56, an outwardly curving portion 58, and a straight portion 60. This nozzle also has a second sidewall 62 which includes both a rounded portion 64 and a straight portion 66. The curving and straight portions 56, 58, 60 of the first nozzle sidewall 54 cooperate with the rounded and straight portions 64, 66 of the second nozzle sidewall 62 to form a nozzle throat region leading into the port 26.

The nozzle configuration shown in FIG. 8 is commonly known in the art as a discrete 2-D C-D nozzle or jet. Each nozzle in this configuration has a pair of straight outer sidewalls 68, 70 which are oriented generally perpendicular to the bottom surface 14 of the fuselage. Each nozzle also has a straight but sloping sidewall 72 which generally faces outwardly relative to the aircraft 10.

Still another embodiment of the invention is shown in FIG. 9. In this embodiment, a plurality of nozzles 24 may be positioned in the region 40 having the cross section generally shown in the lower part of FIG. 9. Each nozzle 24 has a first sidewall 74 that includes an inwardly curving portion 76 and a straight portion 78. Each nozzle also has a second sidewall portion 80 having a rounded portion 82 and a straight portion 84. The curving and straight portions 76, 78 of the first sidewall 74 cooperate with the rounded and straight portions 82, 84 of the second sidewall 80 to form still another configuration of a nozzle throat region. The outer portion 86 of each nozzle in FIG. 9 has a half-rounded surface as shown in the top part of FIG. 9.

Figure 10:
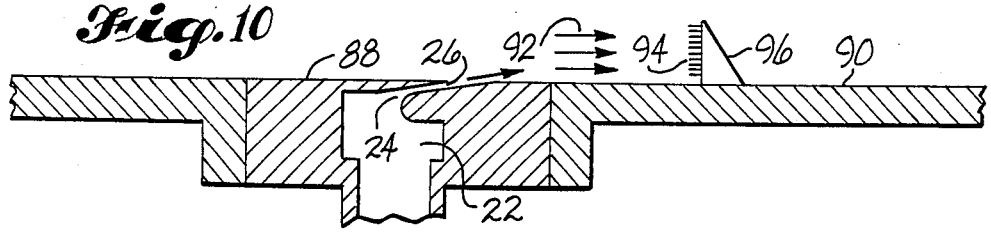
FIG. 10 is a cross-sectional view of a wind tunnel test section, and shows an insert having a pressure plenum and nozzle like the nozzle shown in FIG. 7 positioned in a surface in a wind tunnel, and a wedge having a plurality of pressure transducers juxtapositionally positioned vertically relative to the surface, for measuring the pressure profile of the air in the wind tunnel.

All of the nozzle configurations described and illustrated in FIGS. 7–9 were tested in a wind tunnel test section much like that shown in FIG. 10. Each nozzle configuration was constructed as part of an insert 88 that was placed in a surface 90 in a wind tunnel. An airflow 92 was generated adjacent the surface 90 to simulate aircraft flight. A plurality of pressure transducers 94 were positioned in a vertical surface of a wedge 96 mounted to the surface 90. The pressure transducers 94 were positioned away from the surface 90 at different vertical positions so that they could measure the pressure profile of the airflow 92 after it was re-energized by the nozzle 24.

Figure 11:
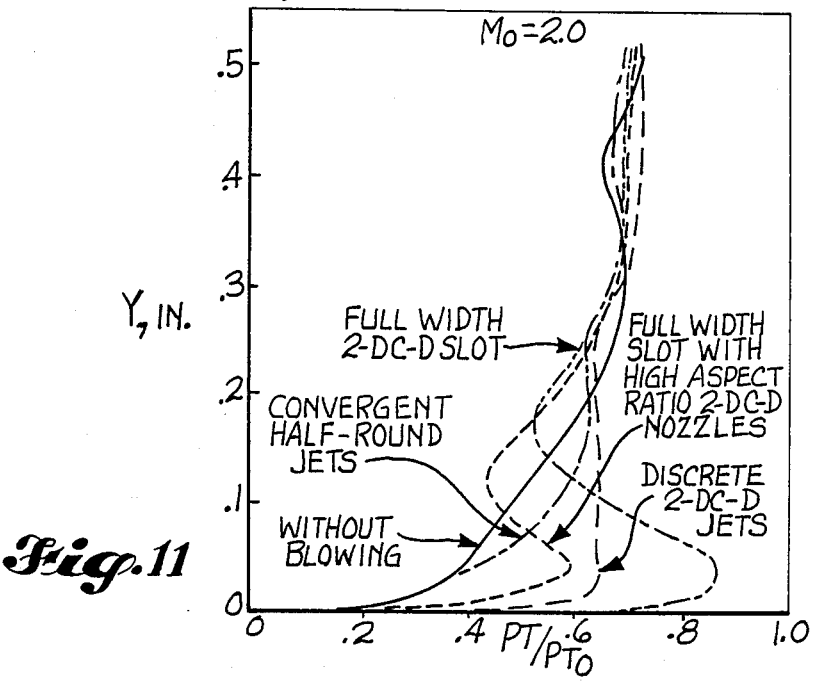
FIG. 11 is a graph, like FIG. 3, of actual boundary layer pressure profiles produced by the test configuration shown in FIG. 10, for a wind tunnel airflow traveling at mach 2.0, and shows the test results for the nozzle insert shown in FIGS. 10 and 7, and for other nozzle inserts, including the nozzles shown in FIGS. 8 and 9.
Figure 12:
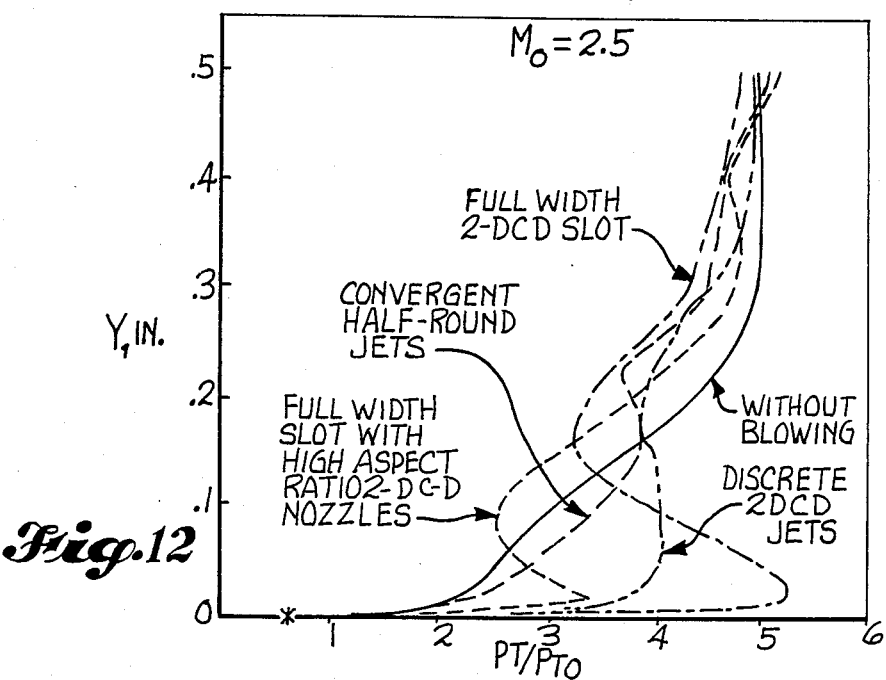
FIG. 12 is a graph like FIG. 11, but shows test results for a wind tunnel airflow traveling at mach 2.5.

FIGS. 11 and 12 show the test results for each nozzle shown in FIGS. 7-9 and for the configuration wherein the full width slot nozzle in FIG. 7 is in the form of a plurality of discrete nozzles. As can be seen in FIGS. 11 and 12, utilizing the discrete 2-D C-D nozzles shown in FIG. 8 will provide sufficient re-energization of the boundary layer so that its profile substantially matches the free stream profile. Future tests may show that other nozzle configurations may provide even better results.

The description provided above is to be used for exemplary purposes only. It is not meant to limit the spirit and scope of the invention in any way. It is to be understood that still other embodiments of the invention, and specifically, different nozzle configurations may be provided without departing from the conceptual teachings of the invention. The invention is to be limited only by the appended claims which follow.

What is claimed is:

1. For use in an aircraft, wherein an air boundary layer having a relatively nonuniform low energy pressure profile develops on an exterior surface thereof, and develops between said exterior surface and freestream air having a relatively uniform high energy pressure profile, said aircraft further having a jet engine inlet, a forward edge of said inlet being positioned in substantially flush relationship with said exterior surface, so that said air boundary layer is normally ingested by said inlet, an apparatus for re-energizing said air boundary layer, to change the pressure profile of said boundary layer so that such profile substantially matches the pressure profile of said freestream air, said apparatus comprising:

at least one nozzle in airflow communication with a source of high pressure air whose pressure is higher than the pressure of said air boundary layer, said nozzle having an outlet port in said exterior surface, said outlet port being positioned forwardly of said engine inlet, and further, said nozzle being shaped in a manner so as to direct said high pressure air from said air source out through said outlet port and into said boundary layer, and shaped in a manner so as to direct such high pressure air both toward said inlet and adjacent said exterior surface, to re-energize said boundary layer's pressure profile so that such profile substantially matches said freestream air profile prior to ingestion of said boundary air by said inlet, and wherein said exterior surface is substantially smooth and continuous between said outlet port and said inlet.

2. The apparatus of claim 1, wherein said air source comprises a high pressure plenum connected to said nozzle, and including means for delivering high pressure bleed air from a jet engine to said high pressure plenum.

3. The apparatus of claim 2, wherein said nozzle includes a first sidewall having a straight portion, and a second sidewall having both a rounded portion and a straight portion, wherein said rounded and straight portions of said second sidewall cooperate with said straight portion of said first sidewall to form a throat region of said nozzle.

4. The apparatus of claim 1, wherein said nozzle outlet port is an elongated slot flushly positioned relative to said exterior surface and extending transversely across said surface forwardly of said jet engine inlet.

5. The apparatus of claim 2, wherein said nozzle includes a first sidewall having an inwardly curving portion, an outwardly curving portion and a straight portion, and said nozzle includes a second sidewall having a rounded portion and a straight portion, said curving and straight portions of said first sidewall cooperating with said rounded and straight portions of said second sidewall to form a nozzle throat region.

6. The apparatus of claim 2, wherein said nozzle includes a first sidewall having an inwardly curving portion and a straight portion, and a second sidewall having a rounded portion and a straight portion, said curving and straight portions of said first sidewall cooperating with said rounded and straight portions of said second sidewall to form a nozzle throat region.

7. For use in an aircraft, wherein an air boundary layer having a relatively nonuniform low energy pressure profile develops on an exterior surface thereof, and develops between said exterior surface and freestream air having a relatively uniform high energy pressure profile, said aircraft further having a jet engine inlet, a forward edge of said inlet being positioned in substantially flush relationship with said exterior surface, so that said air boundary layer is normally ingested by said inlet, an apparatus for re-energizing said air boundary layer, to change the pressure profile of said boundary layer so that such profile substantially matches the pressure profile of said freestream air, said apparatus comprising:

at least one nozzle in airflow communication with a source of high pressure air whose pressure is higher than the pressure of said air boundary layer, said nozzle having an outlet port that is substantially flush in relation to said exterior surface, said outlet port being positioned forwardly of said engine inlet, and further, said nozzle being shaped in a manner so as to direct said high pressure air from said air source out through said outlet port and into said boundary layer, and shaped in a manner so as to direct said high pressure air both toward said inlet and adjacent said exterior surfaces, to re-energize said boundary layer's pressure profile so that such profile substantially matches said freestream air profile prior to ingestion of said boundary layer by said inlet, and wherein said exterior surface is substantially smooth and continuous between said outlet port and said inlet.

* * * * *